Patented Aug. 21, 1934

1,971,168

UNITED STATES PATENT OFFICE 1,971,168

OXIDIZING CATALYST AND PROCESS OF MAKING IT

John Morris Weiss, New York, N. Y., assignor to Davis Emergency Equipment Company, Incorporated, New York, N. Y., a corporation of New York No Drawing. Application September 3, 1930
Serial No. 479,579

14 Claims. (Cl. 23—234)

The present invention has for its object the oxidation of oxidizable gases and vapors, such as carbon monoxide, by means of catalysts possessing a high degree of catalytic activity and capable of extending over considerable periods of time. The substances to which my invention is directed are especially adapted for oxidizing carbon monoxide to change it into carbon dioxide and for this purpose they may be used as fillers for canisters employed in conjunction with gas masks, or they may be used in safety devices for the protection of workmen to record the amounts of carbon monoxide in air in excavation work, manholes, and for other purposes.

Another object of my invention is to provide a suitable process for the commercial manufacture of the oxidizing catalysts mentioned above, which not only makes possible a maximum degree of catalytic activity, but also is simple to perform, reliable in its results and inexpensive in carrying it out with unskilled labor after the proper apparatus is installed.

The catalysts produced in accordance with my present invention are compounds consisting of manganese, another metal, oxygen and hydrogen, but may also include compounds of these elements without hydrogen. These compounds may be represented by the general formulæ $M(HMnO_3)_2$ and $M MnO_3$, wherein the symbol M represents one of various possible metals capable of forming them in association with manganese, and may thus be termed, respectively, acid manganites and manganites of the various metals which may be used in association with manganese. In the above formulæ, the metal M is represented as a divalent metal, although it is understood that the formulæ should be appropriately altered when the metal used is of a different degree of valency. The metals which may be used may include copper, cerium, mercury, iron, nickel, tin, etc. These new compounds are produced as a result of certain novel chemical reactions.

For purpose of brevity, the given metal selected for compounding with manganese (which is represented by the symbol M in the above formulæ) will be referred to herein as the associated metal.

The catalysts obtained by my present invention are characterized by a very high degree of activity, and may be used with great advantage to accomplish the oxidation of oxidizable gases and vapors, such as carbon monoxide, at ordinary or "room" temperature and below. Among various catalysts produced in accordance with processes described herein and containing various associated metals, a catalyst consisting of acid manganite of copper was found to possess great activity.

It has been definitely established that acid manganite of copper is superior to manganite of copper in producing catalytic activity, and there are strong indications that the acid manganites of all metals which may be used in association with manganese to produce the aforestated compounds are superior, respectively, to the manganites of these metals in producing catalytic activity.

In accordance with my invention, the aforesaid compounds may be prepared by reducing a permanganate by hydrogen peroxide in the presence of the associated metal. Thus, potassium permanganate and a suitable soluble salt of the associated metal may be treated with hydrogen peroxide; the reaction or reactions which take place have been found to yield as a precipitate or precipitates, respectively, acid manganite of the associated metal, or a mixture of acid manganite and manganite of the associated metal, depending on the method of procedure used. A modified process consists in treating the permanganate of the associated metal with hydrogen peroxide, the permanganate of the associated metal being initially prepared by treatment of barium permanganate with a suitable soluble salt of the associated metal, such as the sulphate, with subsequent removal of the precipitated barium sulphate by filtration. This modified process has been found to yield as precipitates a mixture of acid manganite and manganite of the associated metal with predominance of acid manganite, but in relative amounts depending on the method of procedure used.

The precipitates obtained by the processes mentioned above may be treated in a simple manner to produce the desired catalytic materials. These precipitates are thoroughly washed and are subjected to strong pressure such as in a screw press. They are carefully dried at comparatively low temperatures to remove the moisture, broken and sized, the resulting materials being composed of porous agglomerates of small particles. A procedure which has been found satisfactory is to dry the pressed wet materials usually at approximately 130° C. They are then broken, sized, and the sized materials are then dried at a higher temperature of, say, from 200° to 300° C. Preferably, the drying of the materials is carried out in oxygen or in a gas containing free oxygen.

Certain factors have been discovered for governing the composition of the materials obtained by the processes mentioned above, i. e., the relative amounts of acid manganite of the associated metal and manganite of the associated metal precipitated, and also the physical structure of the precipitates whereby catalysts of maximum activity may be obtained. These factors and a method of procedure, utilizing the treatment of potassium permanganate and a salt of the associated metal with hydrogen peroxide, whereby acid manganite of the associated metal may be precipitated as a single compound and as a compound of such physical structure as will produce a catalyst of maximum activity, will be more fully stated hereinafter. I also describe a method of procedure, utilizing the treatment of the permanganate of the associated metal with hydrogen peroxide, whereby there may be produced a large predominance of acid manganite and a material precipitated of such physical structure as will make possible a final product of maximum activity by the use of this modified process.

I have found that, when treating a soluble salt of an associated metal and potassium permanganate with hydrogen peroxide, the reagents tend to produce both the acid manganite and the manganite of the associated metal, but that the relative amounts of the precipitates are governed by the amount of the associated metal present during the reduction of the potassium permanganate by hydrogen peroxide, i. e., during the time the reagents are being admixed together. If an excess of associated metal is present while reaction is taking place, then the manganite of the associated metal may be formed. For example, the addition of hydrogen peroxide to a solution of copper sulphate and potassium permanganate first allows the formation of the normal copper manganite, $CuMnO_3$, (this compound having an atomic ratio of copper to manganese of 1:1), even though the amounts of copper sulphate and potassium permanganate are adjusted to allow the presence of an atomic ratio of copper to manganese of 1:2 in the final mixture; (the latter ratio being that of copper to manganese in the acid manganite of copper, $Cu(HMnO_3)_2$).

In order to permit precipitation of the acid manganite of the associated metal as a single compound, I have adopted a precedure whereby the permanganate of potassium is reduced by hydrogen peroxide proportionally as the salt of the associated metal is added to the mixture of the reagents. In accordance with this method, a solution of a salt of the associated metal and hydrogen peroxide is run into a solution of potassium permanganate, all of the reagents being in exact theoretical amounts to yield the acid manganite of the associated metal. If it is desired to produce acid manganite of copper, and copper sulphate is the copper salt used, the reaction which takes place in accordance with this method of procedure is believed to be as follows:

$$CuSO_4 + 2KMnO_4 + 3H_2O_2 = Cu(HMnO_3)_2 + K_2SO_4 + 2H_2O + 3O_2$$

It is to be noted that it is essential that the solution of the salt of the associated metal and hydrogen peroxide should be added to the solution of potassium permanganate, if it is desired to precipitate acid manganite of the associated metal as a single compound. The addition of the solution of potassium permanganate to the other reagents, for instance, would not produce the desired result, as then there would be an excess of the salt of the associated metal while reduction of potassium permanganate is taking place, and formation of the normal manganite of the associated metal would necessarily follow. It is also to be noted that, in view of the fact that the hydrogen peroxide reagent is actually a water solution of hydrogen peroxide, the amount of this reagent necessary to reduce the potassium permanganate should first be determined by test, if the concentration of hydrogen peroxide is not accurately known.

I have determined that the activity of the materials, precipitated either by treatment of a salt of the associated metal and potassium permanganate with hydrogen peroxide or by treatment of the permanganate of the associated metal with hydrogen peroxide, and subsequently treated to produce the final catalytic materials, increases with decreasing concentration or increasing dilution of the reagents. It is possible that the increasing activity of the catalysts with increasing dilution of the reagents is due to increased porosity of the final products.

The activity of the catalysts, produced by my method of procedure, whereby acid manganite of the associated metal is precipitated as a single compound, increases with increasing dilution of the potassium permanganate solution into which the solution of the salt of the associated metal and hydrogen peroxide is run, and the density of the precipitate also increases with increasing dilution of the potassium permanganate solution, indicating changes in the physical structure of the precipitate.

The activity of the catalysts, produced by treatment of the permanganate of the associated metal with hydrogen peroxide, increases with increasing dilution of the solution of the metal permanganate, and I have also found that the activity of such catalysts increases with the rate of precipitation, rapid precipitation producing the most active catalysts. Another factor, which I have found for determining the activity of the catalysts, produced by this modified process, is the degree of purity of the metal permanganate solution; the presence, in this solution, of the salt of the associated metal used in preparing the metal permanganate probably causes a lowering of the activity of the final product by reason of formation of the normal manganite of the associated metal.

The increased activity of the catalysts, produced by treatment of the permanganate of the associated metal with hydrogen peroxide, with increasing dilution of the reagents, is probably due in part to changes in the physical structure of the precipitates, and also partly to increased predominance of acid manganite of the associated metal precipitated. I also believe that rapid precipitation, by this process, increases the relative amount of acid manganite precipitated, resulting in increased activity of the final product.

If copper is used as the associated metal, acid manganite of copper, obtained by my modified process, is, I believe, formed in accordance with the following reaction:

$$Cu(MnO_4)_2 + 3H_2O_2 = Cu(HMnO_3)_2 + 2H_2O + 3O_2$$

An excess of the copper salt used in preparing the copper permanganate solution, appears to permit the formation of the normal manganite of copper, and if copper sulphate is the copper salt used in preparing the copper permanganate solution, this formation of manganite of copper shows characteristics of proceeding in accordance with the following reaction:

$$CuSO_4 + Cu(MnO_4)_2 + 3H_2O_2 = 2CuMnO_3 + H_2SO_4 + 2H_2O + 3O_2$$

Thus, a preferred method of procedure, whereby a predominance of acid manganite of the associated metal may be produced by treatment of the permanganate of the associated metal with hydrogen peroxide, is to add the hydrogen peroxide reagent quickly to a metal permanganate solution as free as possible of impurities, the hydrogen peroxide reagent being added until all of the metal permanganate is reduced. The degree of dilution of the metal permanganate solution also determines the amount of acid manganite of the associated metal in the material precipitated and the activity of the final product.

A procedure which I have used successfully in preparing a material consisting of acid manganite of copper and have found to possess great catalytic activity, is as follows:

Dissolve 66 grams of copper sulphate in such amount of water as to produce 1 gallon of copper sulphate solution, and dissolve 84 grams of potassium permanganate in such amount of water as to produce 1 gallon of potassium permanganate solution. The amount of a hydrogen peroxide solution of approximatly 30% concentration required to reduce the potassium permanganate is determined by test, and in accordance with this test, the required amount, say 180 cubic centimeters of this hydrogen peroxide solution, is admixed with the copper sulphate solution, no reaction taking place. The potassium permanganate solution is mixed with 44 gallons of water, and the solution of copper sulphate and hydrogen peroxide is introduced through a tube into the bottom of the tank holding the diluted potassium permanganate solution, the oxygen evolved during the reaction furnishing the required agitation to mix the reagents. The resulting precipitate, consisting of acid manganite of copper, is removed by filtration and washed free of potassium sulphate. The precipitate is then formed by pressure into a coherent mass, and the latter dried at 130° C., broken and sized, and the sized material further dried at 200° C. The final product tested against a carbon monoxide air mixture containing 1% of carbon monoxide will oxidize the carbon monoxide with 100% efficiency for 12½ hours more or less.

In the detailed procedure given above, the concentration of the reagents in the final mixture corresponds to .46 gram of final product per litre of combined reagents, and the apparent density of a sample of the precipitate, dried at 100° C., is .533. A catalyst consisting of acid manganite of copper and formed in a manner as outlined in the detailed procedure above, but with the potassium permanganate solution diluted to produce a concentration corresponding to 1.86 grams of final product per litre of combined reagents, when tested in the same manner, oxidized the carbon monoxide with 100% efficiency for 6 hours and 10 minutes, and the apparent density of a sample of this precipitate, dried at 100° C., was .356. A catalyst, again consisting of acid manganite of copper and produced in a similar manner, but with a concentration corresponding to 12.6 grams of final product per litre of combined reagents, when tested in the same manner, oxidized the carbon monoxide with 100% efficiency for 1 hour and 39 minutes. These tests show the extent of increased activity of the catalysts with increasing dilution of the reagents.

Another procedure which I have carried out in order to obtain a predominance of acid manganite of copper by treatment of copper permanganate with hydrogen peroxide, is the following:

100 grams of barium permanganate are dissolved in 5 litres of water. A copper sulphate solution having 66.5 grams of copper sulphate of the formula $CuSO_4.5H_2O$ is added to the barium permanganate solution. The precipitated barium sulphate is filtered off, and the filtrate, consisting of permanganate of copper, is treated with a 4% solution of hydrogen peroxide until all of the copper permanganate is reduced, the evolution of oxygen furnishing the required agitation to mix the reagents. The precipitated material is then treated in any well known manner, such as outlined heretofore, to produce the final catalytic material.

Analysis of a material, precipitated in accordance with the latter procedure, shows an atomic ratio of copper to manganese of 1:1.89, indicating a large predominance of acid manganite of copper, and the final product has a life of 2 hours and 35 minutes with 100% efficiency in the oxidation of carbon monoxide. It should be observed, however, that the concentration of the reagents in the latter procedure corresponds to about 12 grams of final product per litre of combined reagents, which is considerably greater than the concentration of the reagents in the first detailed procedure (which corresponds to .46 gram of final product per litre of combined reagents), and that more diluted solutions of copper permanganate would correspondingly yield materials possessing greater activity.

The process of treating potassium permanganate and a salt of the associated metal with hydrogen peroxide which I have devised is particularly important when it is desired to produce a catalyst of maximum activity, in that, by its use, precipitation of the acid manganite of the associated metal as a single compound may be more accurately controlled. Another advantage of this preferred process resides in its simplicity and economy, in that it obviates the necessity of preparing the permanganate of the associated metal, which preparation is required when using the modified process hereinbefore stated. However, by proper control, the modified process may be caused to yield a large predominance of acid manganite of the associated metal, but, when using copper as the associated metal, the presence of manganite of copper materially lowers the catalytic activity of the final product, and there are strong indications that the lowering of the activity of the final product by reason of the presence of the normal manganite holds true for all of the possible metal constituents which may be used in association with manganese.

It is desired to be understood that the invention is not limited to the detailed procedures outlined herein, but is subject to various modifications without departing from its principle.

What is claimed is:

1. A process for the catalytic oxidation of carbon monoxide contained in a gas which comprises contacting said gas with a catlyst comprising a manganite of a heavy metal.

2. A process for the catalytic oxidation of carbon monoxide contained in a gas which comprises contacting said gas with a catalyst comprising a manganite of copper.

3. A process for the catalytic oxidation of carbon monoxide contained in a gas which comprises contacting said gas with a catalyst comprising a manganite of a metal of the iron group.

4. A process for the catalytic oxidation of carbon monoxide contained in a gas which comprises contacting said gas with a catalyst comprising an acid manganite of a heavy metal.

5. A process for the catalytic oxidation of carbon monoxide contained in a gas which comprises contacting said gas with a catalyst comprising an acid manganite of a metal of the iron group.

6. A process for the catalytic oxidation of carbon monoxide contained in a gas which comprises contacting said gas with a catalyst comprising an acid manganite of copper.

7. A process for the catalytic oxidation of carbon monoxide contained in a gas which comprises contacting said gas with a catalyst comprising a mixture of a normal manganite and an acid manganite of a heavy metal.

8. A process for the catalytic oxidation of carbon monoxide contained in a gas which comprises contacting said gas with a catalyst comprising a mixture of a normal manganite and an acid manganite of a metal of the iron group.

9. A process for the catalytic oxidation of carbon monoxide contained in a gas which comprises contacting said gas with a catalyst comprising a mixture of a normal manganite and an acid manganite of copper.

10. A process for the catalytic oxidation of carbon monoxide contained in a gas which comprises contacting said gas with a catalyst containing a normal manganite and an acid manganite of a heavy metal with such acid manganite in predominance.

11. A process for the catalytic oxidation of carbon monoxide contained in a gas which comprises contacting said gas with a catalyst containing a normal manganite and an acid manganite of a metal of the iron group with such acid manganite in predominance.

12. A process for the catalytic oxidation of carbon monoxide contained in a gas which comprises contacting said gas with a catalyst containing a normal manganite and an acid manganite of copper with such acid manganite in predominance.

13. In a process of producing a catalyst, the step of precipitating acid manganite of a heavy metal to the exclusion of normal manganite of said metal, which consists in adding a solution of a salt of said metal and of hydrogen peroxide to a solution of potassium permanganate, the reagents being in theoretical amounts to yield said acid manganite.

14. In a process of producing a catalyst, the step of precipitating acid manganite of copper to the exclusion of normal manganite of copper, which consists in adding a solution of copper sulphate and hydrogen peroxide to a solution of potassium permanganate, the reagents being in theoretical amounts to yield said acid manganite.

JOHN MORRIS WEISS.